(12) United States Patent
Vetters et al.

(10) Patent No.: US 10,487,672 B2
(45) Date of Patent: Nov. 26, 2019

(54) AIRFOIL FOR A GAS TURBINE ENGINE HAVING INSULATING MATERIALS

(71) Applicants: Rolls-Royce Corporation, Indianapolis, IN (US); Rolls-Royce North American Technologies, Inc., Indianapolis, IN (US)

(72) Inventors: Daniel K. Vetters, Indianapolis, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 100 days.

(21) Appl. No.: 15/817,917

(22) Filed: Nov. 20, 2017

(65) Prior Publication Data

US 2019/0153879 A1 May 23, 2019

(51) Int. Cl.
| | |
|---|---|
| *F01D 5/18* | (2006.01) |
| *F01D 5/28* | (2006.01) |
| *F01D 9/04* | (2006.01) |
| *F01D 25/08* | (2006.01) |

(52) U.S. Cl.
CPC ............... *F01D 5/284* (2013.01); *F01D 5/18* (2013.01); *F01D 5/288* (2013.01); *F01D 9/041* (2013.01); *F01D 25/08* (2013.01); *F01D 5/186* (2013.01); *F01D 5/189* (2013.01); *F05D 2220/32* (2013.01); *F05D 2230/90* (2013.01); *F05D 2240/12* (2013.01); *F05D 2260/20* (2013.01); *F05D 2300/20* (2013.01)

(58) Field of Classification Search
CPC .......... F01D 5/288; F01D 5/147; F01D 5/284; F01D 5/282; F01D 5/186; F01D 5/187; F01D 5/18–189; F05D 2230/90
See application file for complete search history.

(56) References Cited

U.S. PATENT DOCUMENTS

| | | | | |
|---|---|---|---|---|
| 5,120,192 | A * | 6/1992 | Ohtomo | F01D 5/189 415/115 |
| 5,383,766 | A * | 1/1995 | Przirembel | F01D 5/186 416/92 |
| 5,419,039 | A * | 5/1995 | Auxier | B23P 15/04 29/889.7 |
| 6,126,400 | A | 10/2000 | Nichols et al. | |
| 6,345,955 | B1 | 2/2002 | Heffron et al. | |
| 6,533,547 | B2 * | 3/2003 | Anding | F01D 5/188 416/241 R |
| 6,761,956 | B2 | 7/2004 | Lee et al. | |
| 7,258,530 | B2 * | 8/2007 | Morrison | F01D 5/147 29/889.71 |
| 7,600,978 | B2 * | 10/2009 | Vance | F01D 5/147 416/230 |

(Continued)

FOREIGN PATENT DOCUMENTS

DE     102004028672 A1     1/2001

*Primary Examiner* — Carlos A Rivera
*Assistant Examiner* — Behnoush Haghighian
(74) *Attorney, Agent, or Firm* — Barnes & Thornburg LLP

(57) ABSTRACT

An airfoil adapted for use in a gas turbine engine is disclosed. The airfoil may include components made from ceramic materials. The airfoil may include insulating material to thermally isolate portions of the airfoil.

9 Claims, 2 Drawing Sheets

(56) References Cited

U.S. PATENT DOCUMENTS

| | | | |
|---|---|---|---|
| 8,052,391 B1* | 11/2011 | Brown | F01D 5/147 |
| | | | 416/223 A |
| 2006/0263217 A1 | 11/2006 | Spanks, Jr. et al. | |
| 2009/0238684 A1 | 9/2009 | Morrison et al. | |
| 2009/0324841 A1 | 12/2009 | Arrell et al. | |
| 2011/0299999 A1 | 12/2011 | James | |
| 2012/0124832 A1 | 5/2012 | Bunker et al. | |
| 2015/0251376 A1 | 9/2015 | Zhang et al. | |
| 2015/0322795 A1* | 11/2015 | Thomas | F01D 5/188 |
| | | | 427/8 |
| 2016/0177743 A1* | 6/2016 | Thomas | F01D 5/284 |
| | | | 416/230 |
| 2017/0030199 A1* | 2/2017 | Barker | F01D 5/189 |
| 2018/0065337 A1* | 3/2018 | Grasso | B32B 15/04 |

\* cited by examiner

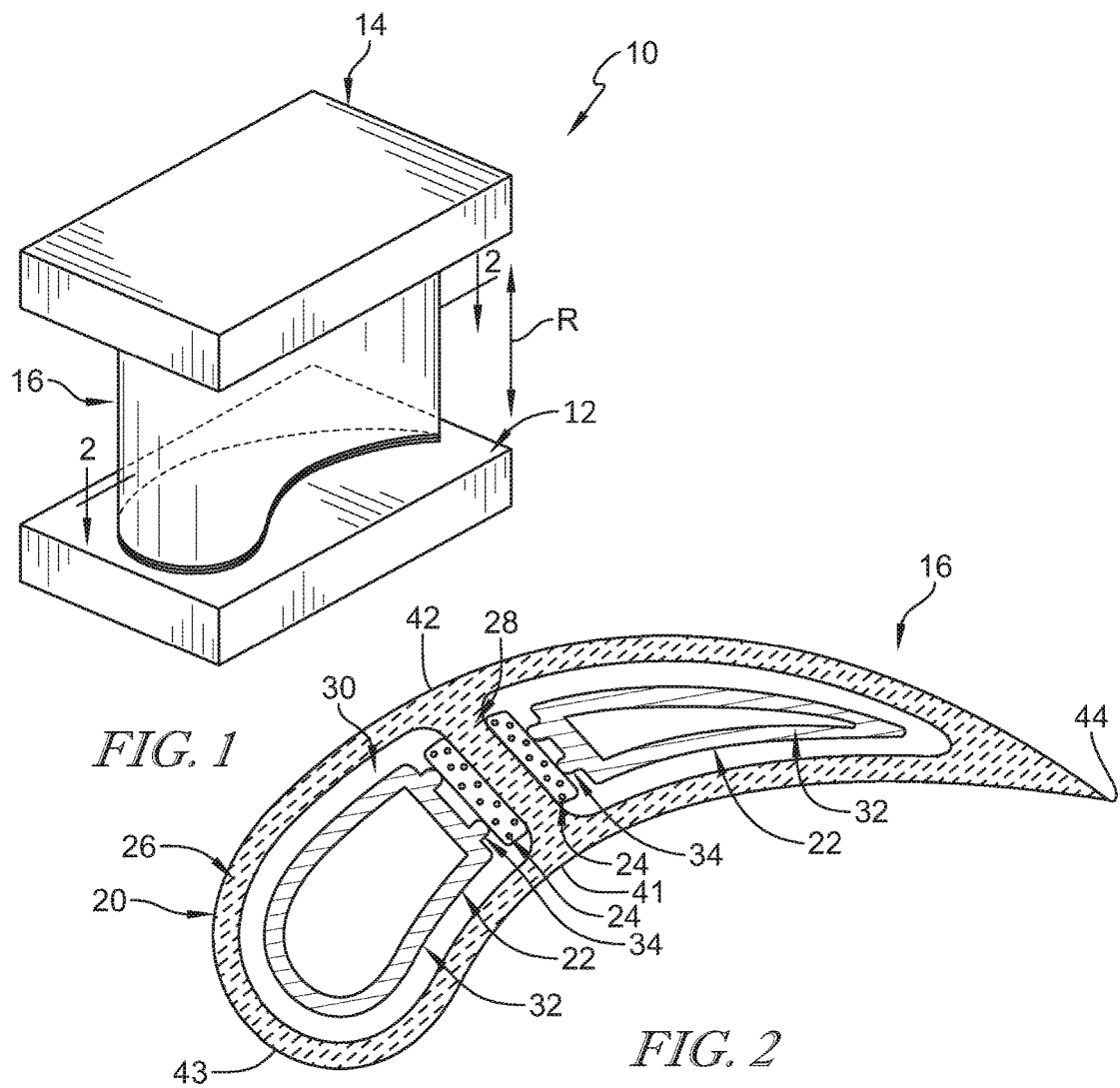
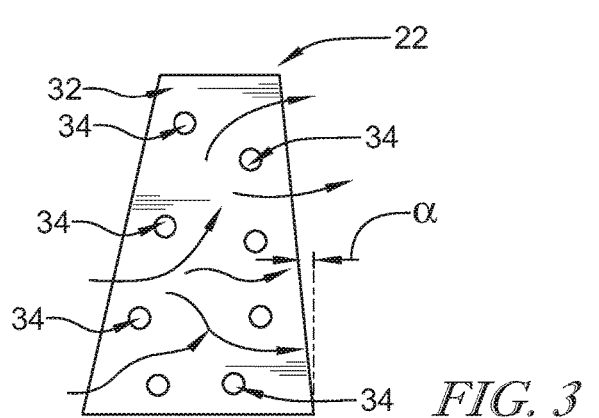
FIG. 1
FIG. 2
FIG. 3

AIRFOIL FOR A GAS TURBINE ENGINE HAVING INSULATING MATERIALS

FIELD OF THE DISCLOSURE

The present disclosure relates generally to vanes used in gas turbine engines, and more specifically to vanes used in gas turbine engines that contain composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

According to one aspect of the present disclosure, an airfoil adapted for use in a gas turbine engine is provided. The airfoil may include a ceramic matrix composite skin and a ceramic matrix composite reinforcement rib. The ceramic matrix composite skin provides a pressure side and a suction side of the airfoil that extends from a leading edge to a trailing edge of the airfoil. The ceramic matrix composite skin is shaped to define an internal cavity between the pressure side and the suction side of the airfoil sized to carry a cooling air flow. The ceramic matrix composite reinforcement rib extends across the internal cavity between the pressure side and the suction side of the airfoil to reinforce the ceramic matrix composite skin.

In illustrative embodiments, the airfoil may include an insulating layer. The insulating layer may have having a thermal conductivity lower than that of the ceramic matrix composite reinforcement rib. The insulating layer engages at least one side of the ceramic matrix composite reinforcement rib to thermally insulate the ceramic matrix composite reinforcement rib from temperatures in the internal cavity.

In illustrative embodiments, the insulating layer engages only the ceramic matrix composite reinforcement rib without engaging the ceramic matrix composite skin so that cavity-facing surfaces of the ceramic matrix composite skin are exposed to temperatures in the internal cavity. The insulating layer may be chemically bonded to the ceramic matrix composite reinforcement rib.

In illustrative embodiments, the airfoil may include a metallic support spar that extends through the internal cavity. The metallic support spar may engage the insulating layer to block movement of the insulating layer in at least one direction.

In illustrative embodiments, the metallic support spar may be formed to include offset pads that extend from a primary post of the metallic support spar. The offset pads may engage the insulating layer to block movement of the insulating layer in at least one direction. The passages sized to carry cooling air along a side of the primary post of the metallic support spar are formed between the offset pads.

In illustrative embodiments, the metallic support spar may be arranged relative to the ceramic matrix composite reinforcement rib with the insulating layer sandwiched therebetween. The metallic support spar and the ceramic matrix composite reinforcement rib may be arranged such that the insulating layer is compressed.

In illustrative embodiments, the metallic support spar may be formed to include a channel that receives the insulating layer. The metallic support spar may be located to block movement of the insulating layer in at least two directions.

According to another broader aspect of the present disclosure, an airfoil adapted for use in a gas turbine engine may include a skin and a reinforcement rib. The skin may provide a pressure side and a suction side of the airfoil that extends from a leading edge to a trailing edge of the airfoil. The reinforcement rib may extend across an internal cavity defined by the skin between the pressure side and the suction side of the airfoil.

In illustrative embodiments, the airfoil may include an insulating layer. The insulating layer may engage at least one side of the reinforcement rib to thermally insulate the reinforcement rib.

In illustrative embodiments, the insulating layer may engage only the reinforcement rib without engaging the skin. Accordingly, cavity-facing surfaces of the skin are exposed to temperatures in the internal cavity.

In illustrative embodiments, the airfoil may include a support spar that extends through the internal cavity. The support spar may engage the insulating layer to block movement of the insulating layer in at least one direction.

In illustrative embodiments, the support spar may be formed to include offset pads that extend from a primary post of the support spar. The offset pads may engage the insulating layer to block movement of the insulating layer in at least one direction. Passages sized to carry cooling air along a side of the primary post of the metallic support spar may be formed between the offset pads.

In illustrative embodiments, the support spar may be arranged relative to the reinforcement rib with the insulating layer sandwiched therebetween. The support spar and the reinforcement rib may be located such that the insulating layer is compressed.

In illustrative embodiments, the support spar may be formed to include a channel that receives the insulating layer. The support spar may be shaped to block movement of the insulating layer in at least two directions.

In illustrative embodiments, the insulating layer may be chemically bonded to the reinforcement rib.

According to another aspect of the present disclosure, a method of making an airfoil for a gas turbine engine is described. The method may include producing a ceramic matrix composite component including a skin and a reinforcement rib. The skin may be shaped to provide a pressure side and a suction side of the airfoil that extends from a leading edge to a trailing edge of the airfoil. The reinforcement rib may be shaped to extend across an internal cavity of the skin between the pressure side and the suction side of the airfoil.

In illustrative embodiments, the method may include placing an insulating layer in contact with the reinforcement rib so that the insulating layer engages at least one side of the ceramic matrix composite reinforcement rib. Accordingly, the insulating layer may thermally insulate the ceramic matrix composite reinforcement rib from temperatures in the internal cavity of the skin.

In illustrative embodiments, the method may include inserting a metallic support spar in the internal cavity of the skin. The method may also include locating the metallic support spar so as to block movement of the insulating layer in at least one direction.

In illustrative embodiments, the support spar may be formed to include offset pads that extend from a primary post of the support spar. The offset pads may engage the insulating layer to block movement of the insulating layer in at least one direction. Passages sized to carry cooling air along a side of the primary post of the metallic support spar may be formed between the offset pads.

In illustrative embodiments, the support spar may be formed to include a channel that receives the insulating layer and blocks movement of the insulating layer in at least two directions.

These and other features of the present disclosure will become more apparent from the following description of the illustrative embodiments.

BRIEF DESCRIPTION OF THE DRAWINGS

FIG. 1 is a perspective view of a turbine vane showing that the turbine vane includes an inner wall, an outer wall, and an airfoil shaped to redirect gasses moving through a gas turbine engine;

FIG. 2 is a cross sectional view of the airfoil of the turbine vane shown in FIG. 1 showing that the airfoil includes a ceramic matrix composite body and metallic support spars arranged in an internal cavity of the ceramic matrix composite body, and further showing that the ceramic matrix composite body forms an outer skin of the airfoil and a reinforcement rib that extends through the internal cavity of the airfoil, and finally showing that an insulating layer is arranged along the reinforcement rib to thermally separate the reinforcement rib from the internal cavity;

FIG. 3 is an elevation view of one of the metallic reinforcement spars shown in FIG. 2 showing that the spar includes a primary post and a plurality of offset pads designed to contact the insulating layer while providing passages sized to carry cooling air along a side of the primary post of the spar;

DETAILED DESCRIPTION OF THE DRAWINGS

Figure 4:
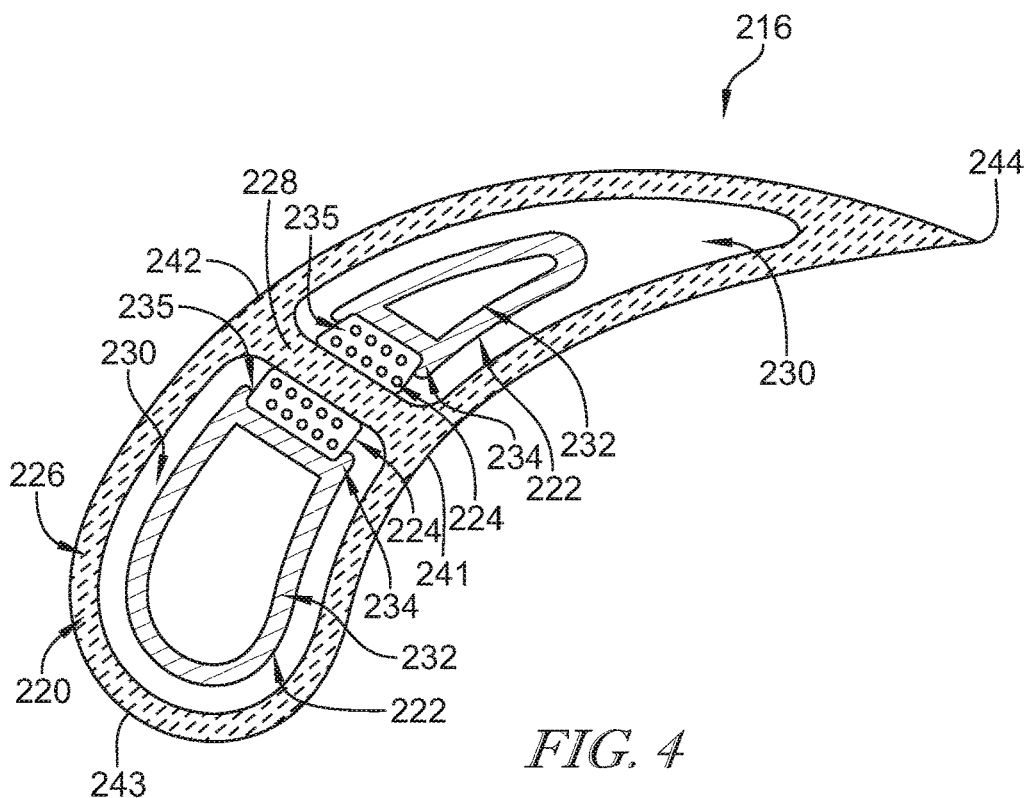
FIG. 4 is a cross sectional view of a second airfoil adapted for use in a turbine vane showing that the airfoil includes a ceramic matrix composite body, metallic support spars arranged in an internal cavity of the ceramic matrix composite body, and insulating layers is arranged along a reinforcement rib included in the ceramic matrix composite body, and further showing that the insulating layers are received in corresponding channels formed by the metallic support spars so that the insulating layers are held in place within the ceramic matrix composite body.

For the purposes of promoting an understanding of the principles of the disclosure, reference will now be made to a number of illustrative embodiments illustrated in the drawings and specific language will be used to describe the same.

An illustrative turbine vane assembly 10 for use in a gas turbine engine is shown in FIG. 1. The turbine vane 10, sometimes simply called a turbine vane or vane 10, includes an inner platform 12, an outer platform 14, and an airfoil 16. The inner platform 12 and outer platform 14 are spaced apart in a radial direction R from one another and cooperate to define a flow path 18 for hot high pressure gasses moving through the turbine section of a gas turbine engine. The airfoil 16 extends in the radial direction R from the inner platform 12 to the outer platform 14 across the flow path 18 to interact with hot gasses moving through the flow path 18.

The airfoil 16 is shaped to redirect hot gasses before those gasses act on rotating blades arranged aft of the airfoil 16 as suggested in FIG. 1. The airfoil 16 includes a ceramic matrix composite body 20, a support spars 22, and insulating layers 24 as shown in the cross sectional view of FIG. 2. The ceramic matrix composite body 20 or composite body 20 is shaped to include an outer skin 26 and a reinforcement rib 28 that extends across an internal cavity 30 defined by the outer skin 26. The support spars 22 extend through the composite body 20 to support the composite body 20 relative to other components of the vane 10. The insulating layers 24 engage the reinforcement rib 28 to thermally insulate the reinforcement rib 28 from cooling air supplied to the internal cavity 30 so as to manage thermal stresses applied to the composite body 20 when used in an engine.

The ceramic matrix composite body 20 comprises ceramic reinforcements suspended in ceramic matrix material to provide a composite component able to withstand high temperatures. The composite body 20 of the illustrated example may include silicon-carbide fibers in a silicon-carbide matrix. Of course other combinations of materials designed to provide a composite component may be used. The composite body 20 may be constructed from laid up sheets, woven tubes, braided ropes, and/or in any other suitable construction to form the described structure.

As noted above, the composite body 20 is formed from outer skin 26 and a reinforcement rib 28 as shown in FIG. 2. The outer skin 26 provides a pressure side 41 and a suction side 42 of the airfoil that extends from a leading edge 43 to a trailing edge 44 of the airfoil 16 to define the internal cavity 30. The reinforcement rib 28 extends across the internal cavity 30 between the pressure side 41 and the suction side 42 of the airfoil 16 to reinforce the outer skin 26.

The internal cavity 30 is sized to conduct cooling air flow through the airfoil 16. Cooling air flow dissipates heat applied to the external surfaces of the outer skin 26 during use in a turbine engine. Pressure is applied to internal surfaces of the outer skin 26 when cooling air is pushed through the airfoil 16. The reinforcement rib 28 resists the pressure from the cooling air and, in so doing, reinforces the outer skin 26.

The support spar 22 are arranged in the exemplary embodiment relative to the reinforcement rib 28 with the insulating layers 24 sandwiched therebetween such that the insulating layers 24 are compressed as shown in FIG. 2. The support spars 22 are each shaped to include a primary post 32 and a number of offset pads 34 as shown in FIGS. 2 and 3. The primary post 32 extends radially through the internal cavity 30 of the airfoil 16 and is configured to be coupled to other support structure for the vane 10. The offset pads 34 extend from the primary post 32 and engage the insulating layers 24 to block movement of the insulating layers 24. The offset pads 34 are shaped to create passages sized to carry cooling air along a side of the corresponding primary post 32 that faces an insulating layer 24.

The support spars 22 are illustratively constructed of metallic materials but, in other embodiments, could be made from ceramic matrix composites, monolithic ceramics, or other suitable materials. In embodiments in which the support spars 22 are made from ceramic matrix composites, they may be co-infiltrated with the inner platform 12 and/or the outer platform 14. In yet other embodiments, support spars 22 may be omitted in part or completely.

The primary post 32 of the support spars 22 are hollow as shown in FIGS. 2 and 3. In other embodiments, the spars 22 may be solid. The primary posts 32 of the support spars 22 are shaped to define a draft angle $\alpha$ because the primary posts 32 neck down as they extend radially outward as suggested in FIG. 3. In other embodiments, the primary posts 32 of the support spars 22 may be shaped to define a different draft angle because the primary posts 32 can neck down as they extend radially inward. The direction of primary post 32 necking can be based on coring during manufacture and how the vane is supported.

The insulating layers 24 engage the reinforcement rib 28 to thermally insulate the reinforcement rib 28 from temperatures in the internal cavity 30 as shown in FIG. 2. In the illustrative embodiment, the insulating layers 24 have a thermal conductivity lower than that of the ceramic matrix composite materials used in the composite body 20. For example, the insulating layers 24 may be made from INTERAM available from 3M, a ceramic fiber paper, a ceramic rope seal, aerogel, or from another suitable material. In other embodiments, the insulating layers 24 may be or may further include a coating or chemically-integrated layer of material that is bonded to the reinforcement rib 28.

A second airfoil 216 adapted for use in turbine vane 10 is shown in FIG. 4. The airfoil 216 includes a ceramic matrix composite body 220, a support spars 222, and insulating layers 224 as shown in the cross sectional view of FIG. 4. The ceramic matrix composite body 220 or composite body 220 is shaped to include an outer skin 226 and a reinforcement rib 228 that extends across an internal cavity 230 defined by the outer skin 226. The support spars 222 extend through the composite body 220 to support the composite body 220 relative to other components of the vane 10. The insulating layers 224 engage the reinforcement rib 228 to thermally insulate the reinforcement rib 228 from cooling air supplied to the internal cavity 230 so as to manage thermal stresses applied to the composite body 220 when used in an engine.

The ceramic matrix composite body 220 comprises ceramic reinforcements suspended in ceramic matrix material to provide a composite component able to withstand high temperatures. The composite body 220 of the illustrated example may include silicon-carbide fibers in a silicon-carbide matrix. Of course other combinations of materials designed to provide a composite component may be used. The composite body 220 may be constructed from laid up sheets, woven tubes, braided ropes, and/or in any other suitable construction to form the described structure.

As noted above, the composite body 220 is formed from outer skin 226 and a reinforcement rib 228 as shown in FIG. 4. The outer skin 226 provides a pressure side 241 and a suction side 242 of the airfoil that extends from a leading edge 243 to a trailing edge 244 of the airfoil 216 to define the internal cavity 230. The reinforcement rib 228 extends across the internal cavity 230 between the pressure side 241 and the suction side 242 of the airfoil 216 to reinforce the outer skin 226.

The internal cavity 230 is sized to conduct cooling air flow through the airfoil 216. Cooling air flow dissipates heat applied to the external surfaces of the outer skin 226 during use in a turbine engine. Pressure is applied to internal surfaces of the outer skin 226 when cooling air is pushed through the airfoil 216. The reinforcement rib 228 resists the pressure from the cooling air and, in so doing, reinforces the outer skin 226.

The support spars 222 are arranged in the exemplary embodiment relative to the reinforcement rib 228 with the insulating layers 224 sandwiched therebetween such that the insulating layers 224 are compressed as shown in FIG. 4. The support spars 222 are each shaped to include a primary post 232 and retention ridges 234 as shown in FIG. 4. The primary posts 232 extend radially through the internal cavity 230 of the airfoil 216 and is configured to be coupled to other support structure for the vane 210. The retention ridges 234 cooperate with the primary post 232 to provide a channel 235 that receives a corresponding insulating layer 224. The primary posts 232 and the retention ridges 234 engage the insulating layers 224 to block movement of the insulating layers 224.

The support spars 222 are illustratively constructed of metallic materials but, in other embodiments, could be made from ceramic matrix composites, monolithic ceramics, or other suitable materials. In embodiments in which the support spars 222 are made from ceramic matrix composites, they may be co-infiltrated with the inner platform 12 and/or the outer platform 14 of the vane 10. In other embodiments, support spars 222 may be omitted in part or completely.

The insulating layers 224 engage the reinforcement rib 228 to thermally insulate the reinforcement rib 228 from temperatures in the internal cavity 230 as shown in FIG. 4. In the illustrative embodiment, the insulating layers 224 have a thermal conductivity lower than that of the ceramic matrix composite materials used in the composite body 220. For example, the insulating layers 224 may be made from INTERAM available from 3M, a ceramic fiber paper, a ceramic rope seal, aerogel, or from another suitable material. In other embodiments, the insulating layers 224 may be or may also include a coating or chemically-integrated layer of material that is bonded to the reinforcement rib 28.

Figure 5:
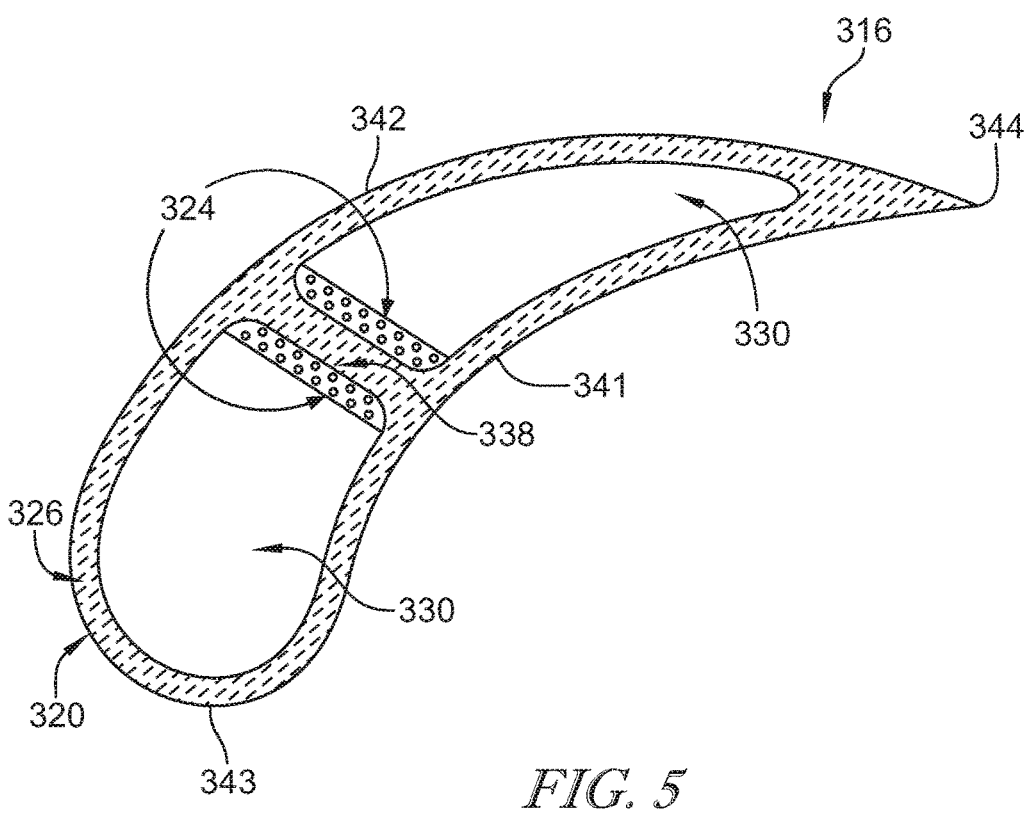
FIG. 5 is a cross sectional view of a third airfoil adapted for use in a turbine vane showing that the airfoil includes a ceramic matrix composite body and insulating layers is arranged along a reinforcement rib included in the ceramic matrix composite body, and further showing that the insulating layers are coating layers chemically bonded to the reinforcement rib.

A third airfoil 316 adapted for use in turbine vane 10 is shown in FIG. 5. The airfoil 316 includes a ceramic matrix composite body 320 and insulating layers 324 as shown in the cross sectional view of FIG. 5. The ceramic matrix composite body 320 is shaped to include an outer skin 326 and a reinforcement rib 328 that extends across an internal cavity 330 defined by the outer skin 326. The insulating layers 224 are bonded to the reinforcement rib 328 to thermally insulate the reinforcement rib 328 from cooling air supplied to the internal cavity 330 so as to manage thermal stresses applied to the composite body 320 when used in an engine.

The ceramic matrix composite body 320 comprises ceramic reinforcements suspended in ceramic matrix material to provide a composite component able to withstand high temperatures. The composite body 320 of the illustrated example may include silicon-carbide fibers in a silicon-carbide matrix. Of course other combinations of materials designed to provide a composite component may be used. The composite body 320 may be constructed from laid up sheets, woven tubes, braided ropes, and/or in any other suitable construction to form the described structure.

As noted above, the composite body 320 is formed from outer skin 326 and a reinforcement rib 328 as shown in FIG. 5. The outer skin 326 provides a pressure side 341 and a suction side 342 of the airfoil that extends from a leading edge 343 to a trailing edge 344 of the airfoil 316 to define the internal cavity 330. The reinforcement rib 328 extends across the internal cavity 330 between the pressure side 341 and the suction side 342 of the airfoil 316 to reinforce the outer skin 326.

The internal cavity 330 is sized to conduct cooling air flow through the airfoil 316. Cooling air flow dissipates heat applied to the external surfaces of the outer skin 326 during use in a turbine engine. Pressure is applied to internal surfaces of the outer skin 326 when cooling air is pushed through the airfoil 316. The reinforcement rib 328 resists the pressure from the cooling air and, in so doing, reinforces the outer skin 326.

In some embodiments, an optional structural spar can be included in the airfoil 316. Such a spar may be like those shown in the other described embodiments.

The insulating layers 324 are chemically bonded to the reinforcement rib 328 to thermally insulate the reinforcement rib 328 from temperatures in the internal cavity 330 as shown in FIG. 5. In the illustrative embodiment, the insulating layers 3224 have a thermal conductivity lower than that of the ceramic matrix composite materials used in the composite body 320. For example, the insulating layers 324 may be made from thermal barrier coatings (TBC).

While the airfoils 16, 216, 316 of the present disclosure are shown in the context of a turbine vane 10, it is contemplated that the described airfoils 16, 216, 316 may be used in other components. For example, the airfoils 16, 216, 316 may be used in compressor vanes, compressor blades, and/or turbine blades. Further, while the exemplary embodiment shows a singlet vane 10 incorporating a single airfoil, it is conceived that multiple airfoils may be incorporated into the vane 10 to provide a doublet vane, triplet vane, or another multi-airfoil structure.

Designs in accordance with the present disclosure can be characterized by lining one or both sides of a rib in a composite airfoil with an insulating layer to protect the rib from the cooling effects of the internal cooling air by either providing a low conductivity layer between the rib wall and the internal cavity and/or by providing separation between the flow of the cooling air scrubbing the wall and the composite rib. By insulating the rib, the rib should settle out close to the wall temperature at steady state. Therefore the steady state thermal gradient between the rib and wall temperatures should be reduced, thereby reducing the thermal stress levels.

Some potential embodiments of this design are described above; however, other embodiments within the spirit of this concept are contemplated. These could also be combined with one concept insulating one side of a rib and another concept insulating the other side of the rib.

It should be noted that some of the examples in this disclosure include a spar (likely metallic, but possibly CMC, or monolithic ceramic) that runs radially through the internal cavity or cavities to support the vane assembly. In such cases, cooling flow may flows through the gap between the spar and the rib. In such cases, the insulating layer would be located between the spar and the side of the rib.

In the configuration of FIGS. 1-3 an airfoil 16 includes an integral rib 28 extends between the pressure side 41 and suction side 42, a spar 22 running through the cavities 30 on both sides of the rib 28, and an insulating (low thermal conductivity) layer 24 compressed between the spar 22 and the rib wall 28. As shown, this embodiment could function by blocking air flow from flowing against the rib 28 and by providing a restrictive heat path for heat exiting the rib 28 (by having low thermal conductivity). The insulating material could be captured in the rib direction by the airfoils walls/skin 20, or it could be captured within a slight groove in the spar face.

Draft within the internal cavity 30 can be used to facilitate assembly and compression of the insulating layer 24. If there is no draft, it could be a difficult task to compress the insulating layer 24 while sliding the spar 22 radially into the internal cavity 30. To accommodate this challenge, the spar 22 could be offset away from the rib 28 during assembly and then pulled into place, compressing the insulating layer 24 after insertion. The insulating piece 24 could be placed against one of the mating surfaces.

An assembly tool such as a thin piece of metal could be placed against the insulating layer 24 and used to precompress the insulating layer 24. Once assembled, the thin, protective piece of metal could be pulled out, allowing the insulating layer 24 to expand out, against the opposite mating surface. The compressive insulating material could be encapsulated in a thin metallic foil to provide protection during handling, assembly, and operation. This would protect a non-durable insulating layer by providing a wear surface and by protecting it from damage. Typically the metallic foil would be a high temperature Nickel or Cobalt alloy. Note that foil is not necessarily a structural member and could be allowed to crack, oxidize, etc. throughout life as long as the foil and insulating layer remain in place. In some embodiments, a thin sheet of monolithic ceramic could be placed between the foil encapsulated insulating layer and the rib 28, thereby isolating the metallic foil from the ceramic matrix composite materials of the airfoil body 20.

This concept could be used with a vane that did not contain a spar. If the insulating layer 24 is adequately stiff, perhaps by foil wrapping or due to construction, then either end could be captured in the end wall assemblies of the vane and biased against the rib wall. If the insulating layer 24 is not durable or stiff enough for this type of mounting, then a metallic piece that does not function as a spar could still be placed through the vane 16 and used to locate the insulating layer 24 against the rib 28.

According to some embodiments in line with the present disclosure, a low conductivity spacer between the rib 28 and spar 22 which would discourage the air from flowing against the surface of the rib 28, thereby reducing the heat transfer between the two. This embodiment is shown in FIGS. 1-3. Such designs can include offset pads 34 which would allow air to flow from one end of the rib to the other without scrubbing the rib 28 surface. Because of the large flow area through the offset pads 34, the pressure drop would be very low. With a low delta P driving the flow, the air could end up flowing around and through the offset pads 34 (the large flow area path) rather than squeezing through the tight gap between the spacer and the rib 28.

In some embodiments, the offset pads 34 may be part of a separate spacer component. By making the spacer out of a relatively low conductivity material, any heat transferred from the rib 28 to the spacer would be discouraged from conducting to the offset pad face, into the air. Also, if the spacer is a slight loose fit, the thermal conductivity from the rib 28 across the interface to the spacer will be minimized. A loose fit could also aid assembly and manufacturing.

If not compressed, a more durable (solid) material could be used for the insulating layer and/or spacer. The spacer could be monolithic ceramic, another ceramic matrix component, a gasket material, or some kind of porous or matrix material. A high temperature metal could also be used in instances where the biased flow and loose fit interface are adequate to alleviate the rib 28 thermal gradients and stresses in that particular application. A nickel or cobalt alloy could be used.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil adapted for use in a gas turbine engine, the airfoil comprising
   a ceramic matrix composite skin that provides a pressure side and a suction side of the airfoil that extends from a leading edge to a trailing edge of the airfoil, the ceramic matrix composite skin shaped to define an internal cavity between the pressure side and the suction side of the airfoil sized to carry a cooling air flow,
   a ceramic matrix composite reinforcement rib that extends across the internal cavity between the pressure side and the suction side of the airfoil to reinforce the ceramic matrix composite skin,
   a metallic support spar that extends through the internal cavity, and
   an insulating layer having a thermal conductivity lower than that of the ceramic matrix composite reinforcement rib that engages at least one side of the ceramic matrix composite reinforcement rib to thermally insulate the ceramic matrix composite reinforcement rib from temperatures in the internal cavity,
   wherein the metallic support spar engages the insulating layer to block movement of the insulating layer in at least one direction, and wherein the metallic support spar includes a channel that receives the insulating layer to block movement of the insulating layer in at least two directions.

2. The airfoil of claim 1, wherein the insulating layer engages only the ceramic matrix composite reinforcement rib without engaging the ceramic matrix composite skin so that cavity-facing surfaces of the ceramic matrix composite skin are exposed to temperatures in the internal cavity.

3. The airfoil of claim 2, wherein the insulating layer is chemically bonded to the ceramic matrix composite reinforcement rib.

4. The airfoil of claim 1, wherein the metallic support spar is arranged relative to the ceramic matrix composite reinforcement rib with the insulating layer sandwiched therebetween such that the insulating layer is compressed.

5. An airfoil adapted for use in a gas turbine engine, the airfoil comprising
   a skin that provides a pressure side and a suction side of the airfoil that extends from a leading edge to a trailing edge of the airfoil,
   a reinforcement rib that extends across an internal cavity defined by the skin between the pressure side and the suction side of the airfoil,
   a support spar that extends through the internal cavity, and
   an insulating layer that engages at least one side of the reinforcement rib to thermally insulate the reinforcement rib,
   wherein the support spar engages the insulating layer to block movement of the insulating layer in at least one direction, and wherein the support spar includes a channel that receives the insulating layer to block movement of the insulating layer in at least two directions.

6. The airfoil of claim 5, wherein the insulating layer engages only the reinforcement rib without engaging the skin so that cavity-facing surfaces of the skin are exposed to temperatures in the internal cavity.

7. The airfoil of claim 5, wherein the support spar is arranged relative to the reinforcement rib with the insulating layer sandwiched therebetween such that the insulating layer is compressed.

8. The airfoil of claim 5, wherein the insulating layer is chemically bonded to the reinforcement rib.

9. A method of making an airfoil for a gas turbine engine, the method comprising
   producing a ceramic matrix composite component including a skin and a reinforcement rib, the skin shaped to provide a pressure side and a suction side of the airfoil that extends from a leading edge to a trailing edge of the airfoil, and the reinforcement rib shaped to extend across an internal cavity of the skin between the pressure side and the suction side of the airfoil,
   placing an insulating layer in contact with the reinforcement rib so that the insulating layer engages at least one side of the ceramic matrix composite reinforcement rib to thermally insulate the ceramic matrix composite reinforcement rib from temperatures in the internal cavity of the skin, and
   inserting a metallic support spar in the internal cavity of the skin and locating the metallic support spar so as to block movement of the insulating layer in at least one direction,
   wherein the support spar includes a channel that receives the insulating layer to block movement of the insulating layer in at least two directions.

\* \* \* \* \*